United States Patent [19]
Strasser et al.

[11] Patent Number: 5,102,368
[45] Date of Patent: Apr. 7, 1992

[54] APPARATUS AND METHOD FOR CONVEYING SAUSAGES

[75] Inventors: Karl-Heinz Strasser, Ravensburg; Martin Röck, Tettnang, both of Fed. Rep. of Germany

[73] Assignee: Handtmann A-Punkt Automation GmbH, Baienfurt, Fed. Rep. of Germany

[21] Appl. No.: 667,189

[22] Filed: Mar. 8, 1991

[30] Foreign Application Priority Data

Mar. 12, 1990 [DE] Fed. Rep. of Germany ....... 4007803

[51] Int. Cl.$^5$ ............................................. A23C 15/02
[52] U.S. Cl. ..................................... 452/51; 452/178; 452/183; 452/177
[58] Field of Search ................. 452/51, 178, 183, 177, 452/50, 31, 37

[56] References Cited

U.S. PATENT DOCUMENTS

| | | |
|---|---|---|
| 2,615,196 | 10/1985 | Ohanian ............................ 452/30 |
| 4,209,540 | 6/1980 | Jones ................................. 452/51 |
| 4,417,368 | 11/1983 | Washburn ......................... 452/51 |

FOREIGN PATENT DOCUMENTS 1126270 11/1984 U.S.S.R. ............................... 452/30

*Primary Examiner*—Bruce M. Kisliuk
*Assistant Examiner*—Lawrence Cruz
*Attorney, Agent, or Firm*—Robert W. Becker & Associates

[57] ABSTRACT

An apparatus for conveying sausages from a sausage stuffing machine to a packing unit comprises a deflecting device, with which the sausages are alinged in a defined position on a conveyor belt; a loading station comprising a lifting member and coordinated containers that are arranged above said lifting member and into which the sausages are introduced via the lifting member that penetrates the conveyor belt; a storage unit for transporting said loaded and unloaded containers; and an unloading station which receives the loaded containers via the storage unit and unloads the sausages from the containers synchronously to a working cycle of the packing unit. With the apparatus, sausages portioned and twisted off by a sausage stuffing machine may be introduced into packing containers of a packing unit in an automated manner without personnel touching the sausages.

16 Claims, 2 Drawing Sheets

APPARATUS AND METHOD FOR CONVEYING SAUSAGES

BACKGROUND OF THE INVENTION

The present invention relates to an apparatus and a method for conveying sausages, especially fresh, non-smoked sausages, from a sausage stuffing machine to a packing unit.

Currently, sausages that have been portioned and twisted off in a sausage stuffing machine are removed from that machine manually and are then placed in packing containers of a subsequent packing unit. This method is not only laborious and expensive since up to five people are needed in order to convey the sausages coming from the sausage stuffing machine to the packing unit, but is also unhygienic. Each individual sausage must be picked up by hand and, at times, must be held for an extended period of time so that, during the time needed for a casing exchange in the sausage shifting machine which is working at a high portioning speed, the packing unit which is working in cycles may be loaded. Manually conveying sausages from the sausage shifting machine to the packing unit is therefore not economical and outdated It is therefore an object of the present invention to provide an apparatus and a method with which it is possible to introduce in an automated process the sausages that have been portioned and twisted off by a sausage stuffing machine into packing containers of a packing unit, without the sausages having been touched by personnel. The construction of such an apparatus should be kept simple and, at the same time, the operating costs should be reduced to a great extent by reducing the necessary personnel compared to the required personnel for prior art methods. It is also an object of the present invention to overcome the different operating speeds of the interconnected machines. Also, a simple adjustment with respect to different products should be possible and the capacity of the machine should be programmable.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
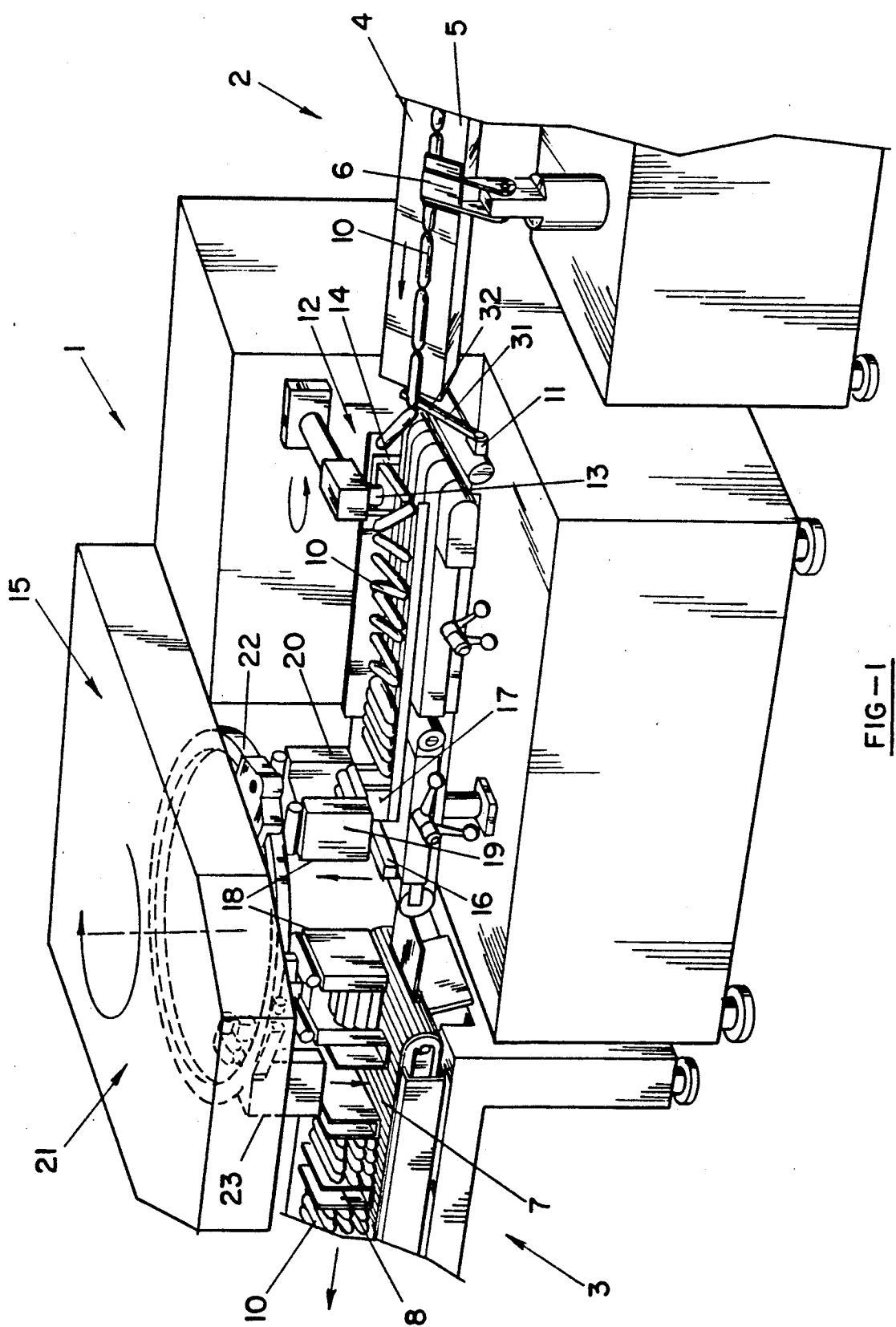
FIG. 1 shows the inventive apparatus comprising a sausage stuffing machine and a packing unit.
Figure 2:
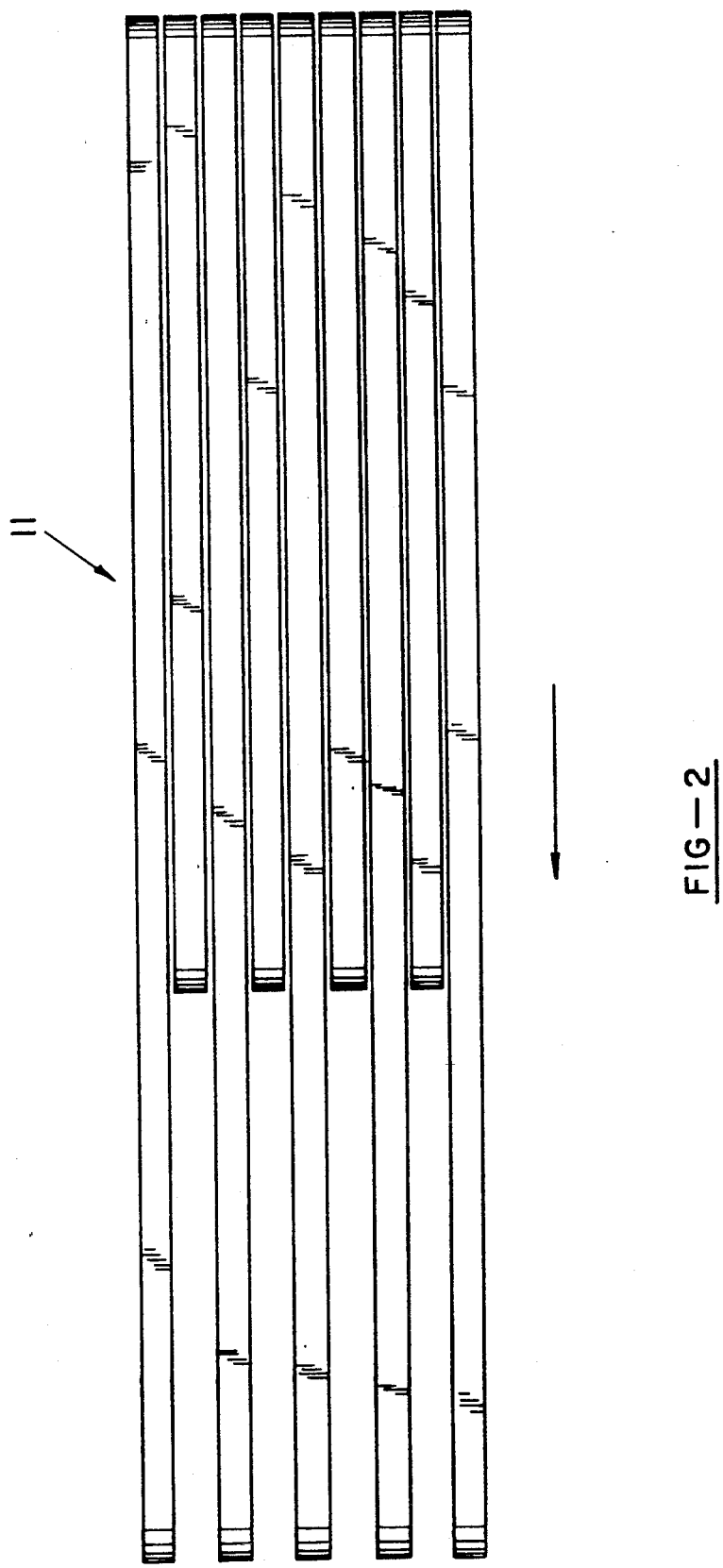
FIG. 2 is a schematic plan view of the conveyor belt.

The apparatus of the present invention is primarily characterized by a deflecting device disposed at a conveyor belt with which the sausages that are conveyed in a lengthwise direction from the sausage stuffing machine to the conveyor belt are aligned in a position transverse to the conveyor belt, a loading station comprising a vertically adjustable lifting member and coordinated containers which are arranged above the lifting member, in which container the sausages are placed in at least a single layer via the lifting member which penetrates the conveyor belt, the storage unit for the transporting the loaded and unloaded containers, and an unloading station, which receives the loaded containers via the storage unit and unloads the sausages from the containers synchronously to the working cycle of the packing unit. Unloading may be preformed onto a respective conveyor belt of the packing unit.

The deflecting device, in a simple embodiment, may be provided in the form of a rotatably drivable body that is disposed above the conveyor belt, and which is provided with deflecting fingers that engage the sausages.

In order to be able to discharge sausages that are incompletely stuffed when a casing exchange takes place, the deflecting device is provided with a discharge member which is controllable with respect to operating conditions of the sausage stuffing machine, for example, the discharge member may be provided in the form of a rod which is pivotable with respect to said conveyor belt in an axially perpendicular manner.

The conveyor belt preferably comprises individual belt sections, that are arranged adjacent to one another in a direction of transportation whereby, in the vicinity of the loading station, some of the individual belt sections are shortened, thus forming slots between the longer ones of the belt sections, so that the lifting member may penetrate the conveyor belt through these slots. The lifting member is, for example, rake-shaped to fit the slots of the conveyor belt.

The containers consist of two halves that are pivotable towards one another. The halves are controllably adjustable at the loading station with respect to the adjustment movements of the lifting member and at the unloading station with respect to a working cycle of the packing unit, for example, via a pneumatic servo device. The storage unit may be embodied as a horizontally arranged, continuously rotating wheel, a belt or similar means, to which the containers, in order to be transported toward the two stations, are coupled in a controllable manner.

The method of the present invention is primarily characterized by aligning the sausages which are conveyed in their lengthwise direction from the sausage stuffing machine to the conveyor belt into a defined position on the conveyor belt via a deflecting device, collecting the sausages at a loading station at the conveyor belt and forming at least one layer, introducing the sausages via a lifting member, which penetrates the conveyor belt and is vertically adjustable, into one of a plurality of containers, transporting the container via the storage unit to the unloading station, and at the unloading station unloading the sausages from the container synchronously to the working cycle of the packing unit. Unloading may be carried out onto a transport belt of the packing unit.

The opening and closing movements of the two halves of the containers are controlled at the loading station with respect to the adjustment movements of the lifting member, while at the unloading station the containers are opened synchronously with the working cycle of the packing unit, for example, via a controllable servo device.

With the inventive apparatus, respectively the inventive method, the transport of the sausages from a sausage stuffing machine to a packing unit is achieved in an automated and continuous process with little operational expenditure. At the same time, the different operation speeds of the interconnected machines are compensated, and the sausages are treated gently so that the amount of low quality products is reduced.

It is also advantageous, that the apparatus with which the sausages are prepared into a packing-ready form, has a high productivity and is also adjustable to different products, so that a high flexibility and a programmable capacity are achieved.

Since the sausages during the conveying process are not touched by personnel and no manual labor is required, a hygienic handling is ensured. The inventive apparatus, respectively the inventive method, therefore allows for the complete automization of the process, from the sausage production in the sausage stuffing machine to the packing in the packing unit, with a minimum constructive expenditure.

DESCRIPTION OF PREFERRED EMBODIMENTS

The present invention will now be described in detail with the aid of several specific embodiments utilizing the drawings. The apparatus 1 serves to automatically convey portioned and twisted-off sausages 10 from a sausage stuffing machine 2 to a packing unit 3 and comprises essentially a conveyor belt 11, a deflecting device 12, a loading station 15, in which the sausages 10 arranged in layers are placed into containers 18, and also a storage unit 21 and an unloading station 23. The sausages 10 are first transported between two transport belts 4 and 5 in their lengthwise direction to the conveyor belt 11, are then rotated 90° via the deflecting device 12, and arranged in one single or in multiple layers. They are then introduced into the containers 18 via the lifting member 17 which penetrates the conveyor belt 11. A cutting device 6 is arranged at the transport belts 4 and 5 so that the continuous sausage link may be accordingly portioned.

The deflecting device 12 consists of a rotatably drivable body 13 which is provided with deflecting fingers 14. The sausages are thus aligned on the conveyor belt 11, which is provided with a friction reducing coating in order to prevent sticking of the sausages 10 to the conveyor belt, whereby the sausages are collected at an abutment 16 and are then introduced into the containers 18 via the lifting member 17. The container 18 is arranged above the lifting member 17. The container 18 consists of two halves 19 and 20 which are pivotable towards one another and are controllable with respect to the adjustment movements of the lifting member 17.

The storage unit 21 is embodied as a continuously driven wheel 22, to which the containers may be coupled in a controllable and driving manner. After the loading of the containers 18 at the loading station 15 is completed the containers are engaged by the wheel 22 and conveyed to the unloading station 23. Synchronous to the working cycle of the packing unit 3, the containers 18 are opened by a servo device which is engaging the adjustment members of the containers. The sausages 10 are then emptied into transport containers 8 which are arranged on the transport belt 7 of the packing unit 3.

Due to the storage unit 21 the different operation speeds of the sausage stuffing machine 2 and the packing unit 3 are compensated, thereby creating a buffer capacity, so that even during a casing exchange at the sausage stuffing machine 2 the cyclically working packing unit 3 is provided with a sufficient amount of sausages 10. The sausage stuffing machine 2, during the stuffing of a casing, discharges the portioned and twisted off sausages 10 at a high rate, while, during a casing exchange, the sausage stuffing machine 2 is shut off. Due to the apparatus 1 a continuous operation of the packing unit 3 is now ensured. In order to be able to sort out incompletely stuffed sausages, which result during a casing exchange, the deflecting device 11 is provided with a discharge member 31 which consists of a rod 32 which is pivotable with respect to the conveyor belt in a plane perpendicular to the direction of transportation. Depending on the operation mode of the sausage stuffing machine 2, the rod 32 is pivoted so that incompletely stuffed sausages that are cut off from the sausage link are discharged to the side.

The present invention is, of course, in no way restricted to the specific disclosure of the specification and drawings, but also encompasses any modifications within the scope of the appended claims.

What we claim is:

1. An apparatus for conveying sausages from a sausage stuffing machine to a packing unit, comprising:
    a deflecting device disposed at a conveyor belt, with which deflecting device said sausages, that are conveyed in a lengthwise direction thereof from said sausage stuffing machine to said conveyor belt, are aligned in a position transverse to said conveyor belt;
    a loading station comprising a vertically adjustable lifting member and coordinated containers that are arranged above said lifting member and into which said sausages are introduced in at least a single layer via said lifting member that penetrates said conveyor belt;
    a storage unit for transporting said loaded and unloaded containers; and
    an unloading station which receives said loaded containers via said storage unit and unloads said sausages from said containers onto receiving means of said packing unit.

2. An apparatus according to claim 1, in which said receiving means of said packing unit is a transport belt onto which said sausages are unloaded.

3. An apparatus according to claim 1, in which said deflection device is formed by a rotatably drivable body that is arranged above said conveyor belt and is provided with deflecting fingers that engage said sausages.

4. An apparatus according to claim 1, in which a discharge member that is controllable with respect to operating conditions of said sausage stuffing machine is positioned before said deflecting device in a direction of transportation of said sausages.

5. An apparatus according to claim 4, in which said discharge member is formed by a rod which is pivotable with respect to said conveyor belt in a plane perpendicular to said direction of transportation.

6. An apparatus according to claim 1, in which said conveyor belt is comprised of individual belt sections that are arranged adjacent to one another in a direction of transport, with some of said individual belt sections, in the vicinity of said loading station, being shortened, thus forming slots between longer ones of said belt sections through which slots said lifting member penetrates said conveyor belt.

7. An apparatus according to claim 6, in which said belt sections are provided with a friction reducing coating.

8. An apparatus according to claim 1, in which said containers are formed by two halves that are pivotable toward and away from one another, with said halves being controllably adjustable at said loading station with respect to adjustment movements of said lifting member and at said unloading station with respect to said receiving means of said packing unit.

9. An apparatus according to claim 8, in which a pneumatically controllable servo device at said unloading station serves to adjust said halves of said containers.

10. An apparatus according to claim 1, in which said storage unit is in the form of a horizontally arranged, continuously rotating wheel, onto which said containers for a transport thereof to said loading and unloading stations are coupled in a controllable manner.

11. An apparatus according to claim 1, in which said storage unit is in the form of a horizontally arranged, continuously rotating belt, which said containers for a transport thereof to said loading and unloading stations engage in a controllable manner.

12. A method for conveying sausages from a sausage stuffing machine to a packing unit comprising the steps of:
   aligning said sausages, that are conveyed in a lengthwise direction thereof from said sausage stuffing machine to said conveyor belt, in a defined position on said conveyor belt with a deflecting device;
   collecting said sausages at a loading station at said conveyor belt and forming at least a single layer;
   introducing said sausages via a lifting member, that penetrates said conveyor belt and is vertically adjustable, into one of a plurality of containers that are disposed above said lifting member;
   transporting said one container via a storage unit to an unloading station; and
   unloading said sausages from said one container at said unloading station in correspondence to a working cycle of said packing unit.

13. A method according to claim 12, further comprising the step of:
   unloading said sausages onto a transport belt of said packing unit.

14. A method according to claim 12, further comprising the step of:
   controlling opening and closing movements of said containers, that are formed of two halves respectively, at said loading station with respect to adjustment movements of said lifting member.

15. A method according to claim 12, further comprising the step of:
   opening said container at said unloading station with respect to a working cycle of said packing unit.

16. A method according to claim 12, further comprising the step of:
   opening of said containers with a controllable servo device.

* * * * *